(12) United States Patent
Xiong et al.

(10) Patent No.: US 11,538,071 B1
(45) Date of Patent: Dec. 27, 2022

(54) OPTIMIZING LEAD GENERATION IN AN ONLINE SYSTEM ENVIRONMENT

(71) Applicant: Meta Platforms, Inc., Menlo Park, CA (US)

(72) Inventors: Hongzheng Xiong, Mountain View, CA (US); Shashank Ramaprasad, San Francisco, CA (US); Rohan Kuruvilla, San Francisco, CA (US); Rachel Barrie Tucker, San Francisco, CA (US); Asad K. Awan, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 44 days.

(21) Appl. No.: 16/057,112

(22) Filed: Aug. 7, 2018

(51) Int. Cl.
| | |
|---|---|
| *G06Q 30/00* | (2012.01) |
| *G06Q 30/02* | (2012.01) |
| *G06Q 50/00* | (2012.01) |
| *G06N 20/00* | (2019.01) |

(52) U.S. Cl.
CPC ......... *G06Q 30/0277* (2013.01); *G06N 20/00* (2019.01); *G06Q 30/0269* (2013.01); *G06Q 50/01* (2013.01)

(58) Field of Classification Search
CPC ............... G06Q 30/0277; G06Q 50/01; G06Q 30/0269; G06N 20/00
See application file for complete search history.

(56) References Cited

U.S. PATENT DOCUMENTS

| | | | |
|---|---|---|---|
| 10,699,304 B1 * | 6/2020 | Mysen | G06Q 30/0259 |
| 2010/0217721 A1 * | 8/2010 | Wormald | G06Q 50/01 |
| | | | 705/319 |
| 2010/0246576 A1 * | 9/2010 | Bustamente | H04L 29/12594 |
| | | | 370/389 |
| 2013/0124628 A1 * | 5/2013 | Weerasinghe | G06Q 30/0241 |
| | | | 709/204 |
| 2014/0237057 A1 * | 8/2014 | Khodorenko | H04L 51/32 |
| | | | 709/206 |
| 2018/0191643 A1 * | 7/2018 | Berry | H04L 51/046 |
| 2018/0225693 A1 * | 8/2018 | Postrel | G06Q 50/01 |
| 2020/0043055 A1 * | 2/2020 | Olds | G06Q 50/01 |

* cited by examiner

*Primary Examiner* — Yehdega Retta
(74) *Attorney, Agent, or Firm* — Fenwick & West LLP

(57) ABSTRACT

An online system communicates a lead generation message to a client device associated with a user. The lead generation message includes a selectable option authorizing a third-party entity to open a channel of communication with the user. If the online system receives from the client device an interaction with the selectable option, the online system sends a notification to the third-party entity indicating that the user associated with the client device interacted with the lead generation content item. The third-party entity may then send a request to the online system to send a message to the user via a messaging system controlled by the online system. The online system thus enables the third-party entity to communicate with the user via the messaging system. The online system then uses information about the communication to train a model to optimize the selection of lead generation messages to users.

20 Claims, 5 Drawing Sheets

OPTIMIZING LEAD GENERATION IN AN ONLINE SYSTEM ENVIRONMENT

BACKGROUND

This disclosure relates generally to online systems and more specifically to optimizing lead generation in online system environments, while protecting the users of an online system from unwanted harassment.

Companies often use online systems to obtain leads, where a lead may include information about a customer or potential customer. For example, the information in a lead may include a name and a telephone number or email address, thereby allowing the company to follow up with the user about its products or services. In one example, an online system sends a user of the online system a message or user interface that has a selectable option enabling the user to share the user's personal information with the third party. The user may share personal information with the third party by filling out an online form and submitting the form to the online system. The online system then sends a report of the user's information to the third-party company, which can then follow up with the user directly.

One drawback of this method is that the online system does not receive downstream feedback regarding the success of the original message. Specifically, because the third-party company can communicate with the user directly, the online system does not know whether the third party actually contacted the user or whether the user responded to such a communication. As such, the online system cannot determine which of its communications to its users led to a successful lead or interaction between the third-party company and the users who saw the message. At best, the online system knows only whether the user submitted the lead information in response to the original message from the online system. This is problematic for online systems that optimize messages using machine learning models to select which users should receive eth lead generation messages. Specifically, if the online system does not know whether there was a successful interaction between the user and the third-party company, the online system cannot train a model that predicts such an interaction. At best, the system can train a model to predict whether a user will submit the lead information in response to the message from the online system. This limits the ability of the online system to provide value to the user and the third-party company that desires the most valuable leads.

Another problem with the conventional approach is that the online system may not be able to distinguish good and bad actors among the third parties. For example, the third party may sell the user's personal information to other third parties with which the user did not desire to share personal information, or the third party may use the acquired personal information to spam the user. As such, users take a risk in responding to the lead generation messages from the online system and may be less likely to provide personal information in response to the online system's lead generation message at all.

SUMMARY

An online system has one or more users and one or more third-party entity. The online system receives from a third-party entity a message for communication to a user of the online system. The message includes a lead generation content item that includes a selectable option enabling the third-party entity to open a channel of communication with the user of the online system. The online system sends the lead generation content item to a client device associated with the user of the online system. The online system receives from the client device an interaction with the selectable option of the lead generation content item. The online system sends a notification to the third-party entity indicating that the client device interacted with the lead generation content item. The notification includes information for sending the user a message using a messaging system provided by the online system. The online system receives from the third-party entity a request to send a lead message related to the lead generation content item to the user via the messaging system. The online system sends the lead message to the user. The information included in the notification may be anonymous.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
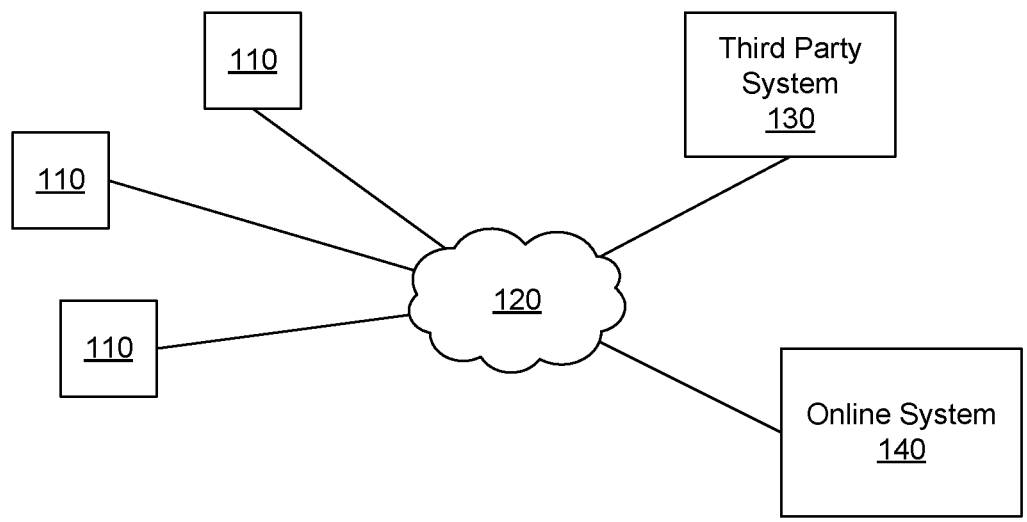
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130. For example, a third-party system 130 may communicate a lead generation content item to the online system 140 for presentation via a client device 110.

Figure 2:
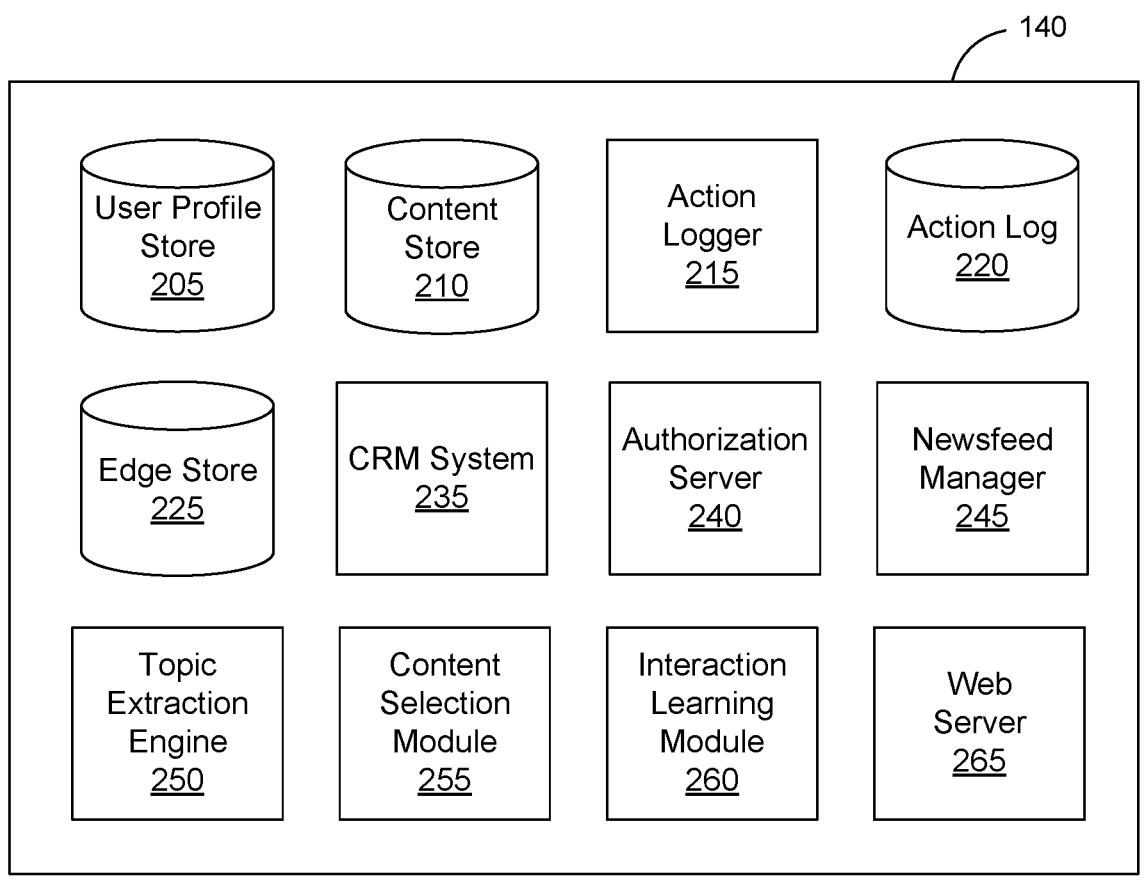
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a CRM system 235, an authorization server 240, a newsfeed manager 245, a topic extraction engine 250, a content selection module 255, an interaction learning module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as name, work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

Specific information included in a user profile may include personal contact information, such as a telephone number, an email address, a residential address, and so on. User profiles may be associated with an account for an instant messaging or other communication service of the online system 140. For example, a user may be associated with an account for an instant messaging service of the online system 140, where the user may access and use the instant messaging service via the online system 140 without having to exit the online system 140 and/or without having to sign in to the instant messaging service independently of the online system 140.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, opening a communication channel with a third party, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store. For example, a campaign may include various lead generation content items.

In one embodiment, targeting criteria may specify actions or types of connections between a user and another user or object of the online system 140. Targeting criteria may also specify interactions between a user and objects performed external to the online system 140, such as on a third-party system 130. For example, targeting criteria identifies users that have taken a particular action, such as sent a message to another user, used an application, joined a group, left a group, joined an event, generated an event description, purchased or reviewed a product or service using an online marketplace, requested information from a third-party system 130, installed an application, or performed any other suitable action. Including actions in targeting criteria allows users to further refine users eligible to be presented with content items. As another example, targeting criteria identifies users having a connection to another user or object or having a particular type of connection to another user or object.

An example of a content item that can include a bid amount is a lead generation content item. A user or entity, such as a third party associated with a user profile, may create a lead generation content item or a campaign including lead generation content items. A lead generation content item has a selectable option enabling a user presented with the lead generation content item to open a communication channel with the entity, thereby allowing the entity to send the user messages. For example, the lead generation content item can include an image of a car and a button "view details" that, when selected by the user, causes the online system 140 to notify the entity that the user interacted with the lead generation content item. The online system 140 may additionally provide a communication channel between the entity and the user, anonymous or otherwise. Furthermore, upon selection of the button, the online system 140 may connect the user to a brand page of the car in the online system 140 or to a relevant page at a third-party system 130 associated with the entity. Lead generation content items may be included in messages or requests from third parties that are received by the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The CRM system 235 manages end-to-end lead generation and the optimization thereof. The CRM system 235 is described in detail with reference to FIG. 3 below.

The authorization server 240 enforces one or more privacy settings of the users of the online system 140. A privacy setting of a user determines how particular information associated with a user can be shared, and may be stored in the user profile of a user in the user profile store 205 or stored in the authorization server 240 and associated with a user profile. In one embodiment, a privacy setting specifies particular information associated with a user and identifies the entity or entities with whom the specified information may be shared. Examples of entities with which information can be shared may include other users, applications, third-party systems 130 or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third-party systems 130, specific third-party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 240 includes logic to determine if certain information associated with a user can be accessed by a user's friends, third-party system 130 and/or other applications and entities. For example, a third-party system 130 that attempts to access a user's comment about a uniform resource locator (URL) associated with the third-party system 130 must get authorization from the authorization server 240 to access information associated with the user. Based on the user's privacy settings, the authorization server 240 determines if another user, a third-party system 130, an application or another entity is allowed to access information associated with the user, including information about actions taken by the user. For example, the authorization server 240 uses a user's privacy setting to determine if the user's comment about a URL associated with the third-party system 130 can be presented to the third-party system 130 or can be presented to another user. This enables a user's privacy setting to specify which other users, or other entities, are allowed to receive data about the user's actions or other data associated with the user.

Furthermore, based on the user's privacy settings, the authorization server 240 may or may not allow presentation of a lead generation content item to the user unless the communication channel that results from interaction with the lead generation content item is anonymous, e.g. the online system 140 does not share personal contact information of the user with the entity providing the lead generation content item. For example, the authorization server 240 may prevent the entity from accessing personal contact information of the user, or may anonymize communications between the entity and the user, or so on. In an embodiment, anonymizing communications between users and entities entails associating the user with an anonymous identifier and using the identifier in place of the user's personal information when sending communications to the entity.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 245 may generate stories for presentation to a user based on information in the action log 220 and in the edge store 225 or may select candidate stories included in the content store 210. One or more of the candidate stories are selected and presented to a user by the newsfeed manager 245.

For example, the newsfeed manager 245 receives a request to present one or more stories to an online system user. The newsfeed manager 245 accesses one or more of the user profile store 105, the content store 110, the action log 120, and the edge store 125 to retrieve information about the identified user. For example, stories or other data associated with users connected to the identified user are retrieved. The retrieved stories or other data are analyzed by the newsfeed manager 245 to identify candidate content items, which include content having at least a threshold likelihood of being relevant to the user. For example, stories associated with users not connected to the identified user or stories associated with users for which the identified user has less than a threshold affinity are discarded as candidate stories.

Based on various criteria, the newsfeed manager 245 selects one or more of the candidate stories for presentation to the identified user.

In various embodiments, the newsfeed manager 245 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 105. The newsfeed manager 245 may also determine the order in which selected stories are presented via the newsfeed. For example, the newsfeed manager 245 determines that a user has a highest affinity for a specific user and increases the number of stories in the newsfeed associated with the specific user or modifies the positions in the newsfeed where stories associated with the specific user are presented. In an embodiment the newsfeed manager 245 selects one or more lead generation content items for inclusion in the newsfeed.

The newsfeed manager 245 may also account for actions by a user indicating a preference for types of stories and selects stories having the same, or similar, types for inclusion in the newsfeed. Additionally, the newsfeed manager 245 may analyze stories received by the online system 140 from various users to obtain information about user preferences or actions from the analyzed stories. This information may be used to refine subsequent selection of stories for newsfeeds presented to various users.

The online system 140 includes a topic extraction engine 250, which identifies one or more topics associated with objects in the content store 210. To identify topics associated with content items, the topic extraction engine 250 identifies anchor terms included in a content item and determines a meaning of the anchor terms as further described in U.S. patent application Ser. No. 13/167,701, filed Jun. 24, 2011, which is hereby incorporated by reference in its entirety. For example, the topic extraction engine 250 determines one or more topics associated with a lead generation content item maintained in the content store 210. The one or more topics associated with a lead generation content item are stored and associated with an object identifier corresponding to the content item. In various embodiments, associations between object identifiers and topics are stored in the topic extraction engine 250 or in the content store 210 to simplify retrieval of one or more topics associated with an object identifier or retrieval of object identifiers associated with a specified topic. Structured information associated with a lead generation content item may also be used to extract a topic associated with the lead generation content item. The extracted topics for a lead generation content item may be used, for example, to select a lead generation content item for inclusion in the newsfeed of a particular user, or for presentation to the user elsewhere. For example, the newsfeed manager 245 and/or CRM system 235 may use the topics of lead generation content items extracted by the topic extraction engine 250 to select lead generation content items that are relevant to the user, e.g. lead generation content items with topics that are determined to be in line with the user's preferences.

The content selection module 255 selects one or more content items for communication to a client device 110 to be presented to a user. Content items eligible for presentation to the user are retrieved from the content store 210 or from another source by the content selection module 255, which selects one or more of the content items for presentation to the viewing user. A content item eligible for presentation to the user is a content item associated with at least a threshold number of targeting criteria satisfied by characteristics of the user (e.g., a lead generation content item associated with a topic determined to be in line with the user's preferences) or is a content item that is not associated with targeting criteria. In various embodiments, the content selection module 255 includes content items eligible for presentation to the user in one or more selection processes, which identify a set of content items for presentation to the user, one or more of which may be lead generation content items. For example, the content selection module 255 determines measures of relevance of various content items to the user based on characteristics associated with the user by the online system 140 and based on the user's affinity for different content items. Based on the measures of relevance, the content selection module 255 selects content items for presentation to the user. As an additional example, the content selection module 255 selects content items having the highest measures of relevance or having at least a threshold measure of relevance for presentation to the user. Alternatively, the content selection module 255 ranks content items based on their associated measures of relevance and selects content items having the highest positions in the ranking or having at least a threshold position in the ranking for presentation to the user.

Content items eligible for presentation to the user may include content items associated with bid amounts, such as lead generation content items. The content selection module 255 uses the bid amounts when selecting content for presentation to the user. In various embodiments, the content selection module 255 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount and a likelihood of the user interacting with the content item. The content selection module 255 may rank content items based on their associated bid amounts and select content items having at least a threshold position in the ranking for presentation to the user. In some embodiments, the content selection module 255 ranks both content items not associated with bid amounts and content items associated with bid amounts in a unified ranking based on bid amounts and measures of relevance associated with content items. Based on the unified ranking, the content selection module 255 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 255 receives a request to present a feed of content to a user of the online system 140. The feed may include one or more content items associated with bid amounts and other content items, such as stories describing actions associated with other online system users connected to the user, which are not associated with bid amounts. The content selection module 255 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 255 to identify candidate content items eligible for presentation to the user. For example, content items associated with users who not connected to the user or stories associated with users for whom the user has less than a threshold affinity are discarded as candidate content items. Based on various criteria, the content selection module 255 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 255 presents content to a user through a newsfeed including a plurality of content items selected for presentation to the user. One or more content items may also be included in the feed. The content selection module 255 may also determine the order in which selected content items are presented via the feed. For example, the content selection module 230 orders content items in the feed based on likelihoods of the user interacting with various content items.

The interaction learning module 260 applies machine learning techniques to generate a lead interaction model that when applied to lead generation content items outputs indications of whether the lead generation content items generate leads. For example, the lead interaction model indicates a likelihood of whether or not presentation of a lead generation content item to a user will cause the user to interact with the lead generation content item.

As part of the generation of the lead interaction model, the interaction learning module 260 forms a training set of lead generation content items by identifying a positive training set of lead generation content items that have been determined to have led to user interaction, and, in some embodiments, forms a negative training set of lead generation content items that did not lead to user interaction.

The interaction learning module 260 extracts feature values from the lead generation content items of the training set, the features being variables deemed potentially relevant to whether or not the lead generation content items have the associated property or properties. For example, the feature values extracted by the interaction learning module 260 can include keywords from textual tags, such as a car brand. One or more topics determined by the topic extraction engine 250 may also be features, depending upon the embodiment. An ordered list of the features for a lead generation content item is herein referred to as the feature vector for the lead generation content item. In one embodiment, the interaction learning module 260 applies dimensionality reduction (e.g., via linear discriminant analysis (LDA), principle component analysis (PCA), or the like) to reduce the amount of data in the feature vectors for content items to a smaller, more representative set of data.

The interaction learning module 260 uses supervised machine learning to train the lead interaction model, with the feature vectors of the positive training set and, in some embodiments, the negative training set, serving as the inputs. Different machine learning techniques—such as linear support vector machine (linear SVM), boosting for other algorithms (e.g., AdaBoost), neural networks, logistic regression, naive Bayes, memory-based learning, random forests, bagged trees, decision trees, boosted trees, or boosted stumps—may be used in different embodiments. The lead interaction model, when applied to the feature vector extracted from a lead generation content item, outputs an indication of whether the lead generation content item has the property in question, such as a Boolean yes/no estimate of user interaction with the lead generation content item, or a scalar value representing a probability. For example, the lead interaction model may determine an interactivity score for a lead generation content item for each of one or more users based on the features of the lead generation content item and of features of the user. The lead interaction model may determine that the lead generation content item is likely to lead to user interaction with the lead generation content item for a particular user if the interactivity score for the particular user with the lead generation content item reaches or surpasses a lead generation threshold. Alternatively, the lead interaction model may determine that the lead generation content item is not likely to lead to user interaction with the lead generation content item for a particular user if the interactivity score for the particular user with the lead generation content item does not reach or surpass the lead generation threshold.

In some embodiments, a validation set is formed of additional lead generation content items, other than those in the training sets, which have already been determined to have or have not led to user interaction with the lead generation content item. The interaction learning module 260 applies the trained validation lead interaction model to the lead generation content items of the validation set to quantify the accuracy of the lead interaction model. Common metrics applied in accuracy measurement include: Precision=TP/(TP+FP) and Recall=TP/(TP+FN), where precision is how many the lead interaction model correctly predicted (TP or true positives) out of the total it predicted (TP+FP or false positives), and recall is how many the lead interaction model correctly predicted (TP) out of the total number of lead generation content items that did lead to user interaction with the lead generation content item (TP+FN or false negatives). The F score (F-score=2*PR/(P+R)) unifies precision and recall into a single measure. In one embodiment, the interaction learning module 260 iteratively retrains the lead interaction model until the occurrence of a stopping condition, such as the accuracy measurement indication that the model is sufficiently accurate, or once a threshold number of training rounds having taken place.

In some embodiments, the interaction learning module 260 applies similar machine learning techniques to generate a lead message interaction model that when applied to lead messages outputs indications of whether lead messages lead to user interaction. A lead message is, for example, a message sent by a third party to a user of the online system via a messaging system of the online system after the user has interacted with a lead generation content item of the third party.

The web server 265 links the online system 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, or BlackberryOS.

Customer Relationship Management (CRM) System

Figure 3:
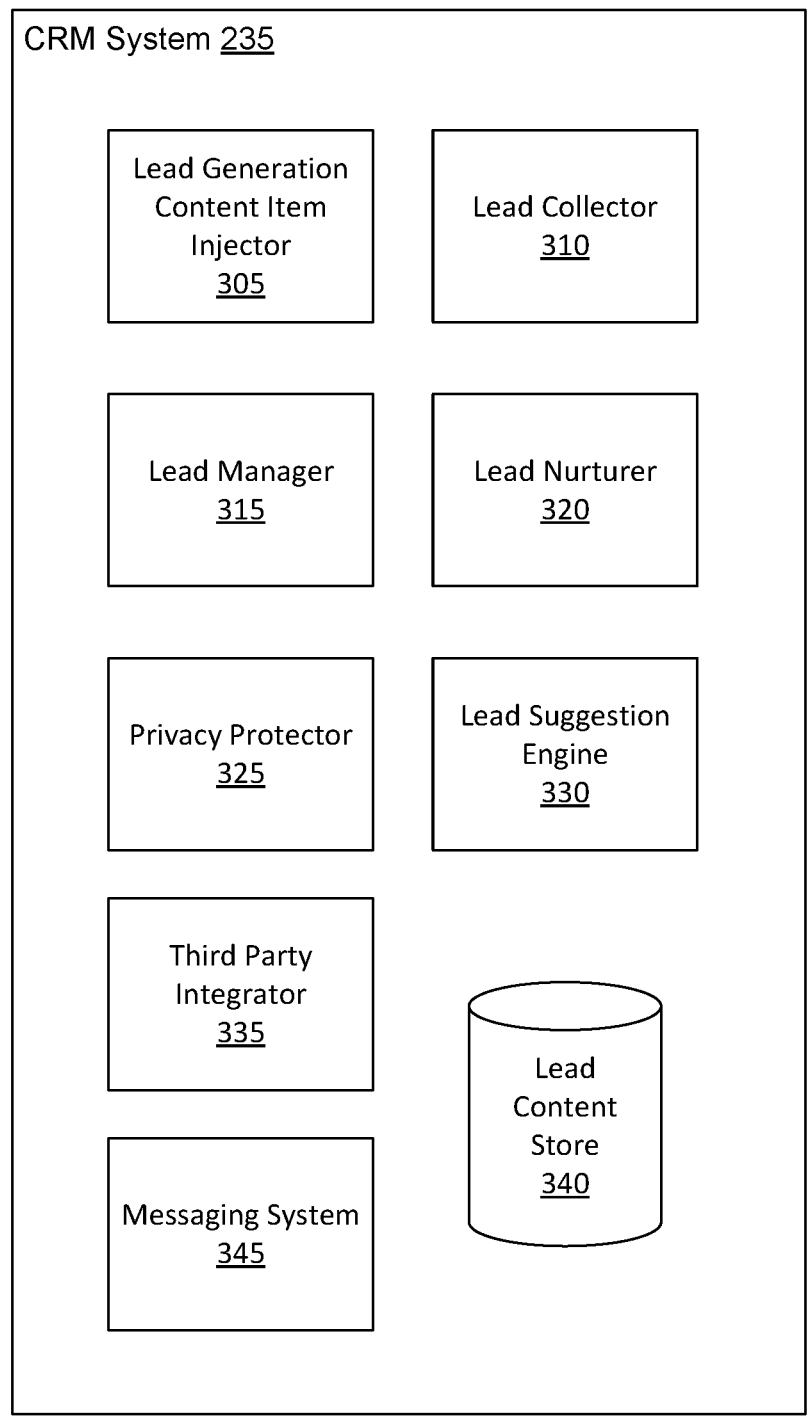
FIG. 3 is a block diagram of a customer resource management (CRM) system, in accordance with an embodiment.

FIG. 3 is a block diagram of a CRM system 235, in accordance with an embodiment. The CRM system 235 includes a lead generation content item injector 305, a lead collector 310, a lead manager 315, a lead nurturer 320, a privacy protector 325, a lead suggestion engine 330, a third-party integrator 335, a lead content store 340, and a messaging system 345. The various components of the CRM system 235 operate with one another and with other components of the online system 140 to provide optimized end-to-end lead generation. Depending upon the embodiment the CRM system 235 may include different or additional components which may have different or additional functionality than detailed herein.

The lead generation content item injector 305 operates in conjunction with the newsfeed manager 245 to add lead generation content items to a user's newsfeed. Depending upon the embodiment the lead generation content item injector 305 also operates to add lead generation content items to other aspects of the online system 140. Entities such as third parties associated with user accounts of the online system 140 may request the communication of one or more lead generation content items to one or more users of the online system 140, e.g. sending the lead generation content items for display at client devices 110 associated with the users. The lead generation content items may be stored in the lead content store 340, from which the lead generation content item injector 305 selects lead generation content items for communication to users. For example, the lead generation content item injector 305 may use a lead interaction model to determine that a particular lead generation content item is appropriate (e.g., reaches or surpasses a lead generation threshold) for a particular set of users, and the lead generation content item injector 305 adds the particular lead generation content item to the newsfeed of each user in the particular set of users. The lead generation content item injector 305 may further operate in conjunction with the content selection module 255 to select lead generation content items for communication to users, depending upon the embodiment.

The lead collector 310 receives lead generation content items for communication to users of the online system 140. For example, the lead collector 310 receives lead generation content items from a third-party system 130, such as car manufacturer that desires to open communication channels with users who may be interested in its cars. The lead collector 310 may associate space in memory for the third party or other entity from which it receives lead generation content items. For example, the space in memory may be for storing lead generation content items, recording users to whom the lead generation content items have been communicated and users who have interacted with the lead generation content items, storing information about the third party or other entity itself, and so on. In an embodiment, the memory space is allocated in the lead content store 340. The lead collector 310 may organize various received lead generation content items, such as by the entities from which the lead generation content items are received.

The lead manager 315 manages lead generation content items and third party control of communication of the lead generation content items. For example, the lead manager 315 may receive input from third parties regarding how many users to display lead generation content items to, when to display them, a type of user to display to (e.g., users with a particular characteristic) and so on, and use the input to direct and control the communication of lead generation content items to users via the online system 140. The lead manager 315 may generate a user interface and subsequently send the user interface to the third party to enable the third party to manage its lead generation content items and the communication to users thereof, such as in a campaign. Furthermore, the lead manager 315 may remove lead generation content items from memory that have been in memory for at least a threshold amount of time, or which meet another condition for removal. As a specific example, a car manufacturer may request creation of a campaign including a lead generation content item for presentation to 10,000 users between the ages of 25 and 30.

The lead nurturer 320 tracks which users interact with which lead generation content items. For example, upon user interaction with a lead generation content item in a newsfeed, the lead nurturer 320 may receive an alert from the online system 140 that the lead generation content item was interacted with by the user. The lead nurturer 320 may interact with the lead content store 340 to store the information it tracks, with the lead manager 315 to enable communication of the information to third parties, and with the interaction learning module 260 to assist in generating lead interaction models.

The lead nurturer 320 may also assist in opening a communication channel between a third party and a user who has interacted with a lead generation content item associated with the third party. For example, the lead nurturer 320 may communicate to the third-party integrator 335 that the user has interacted with the lead generation content item and that a communication channel needs to be opened between the user and the third party. Furthermore, the lead nurturer 320 may be used to remind users of interaction with lead generation content items. For example, a third party may indicate to the lead manager 315 that users who interact with lead generation content items of the third party should be shown information pertaining to the lead generation content item after a certain period of time to remind the users of the lead generation content item. The lead nurturer 320 may in turn operate with the lead generation content item injector 305 and/or the content selection module 255 to communicate the reminder to the users. The reminder may include, for example, contextual information pertaining to the lead generation content item. As a specific example, a reminder pertaining to a lead generation content item pertaining to a particular car brand may include contextual information about the car brand.

In an embodiment the lead nurturer 320 itself initiates the communication channel, such as instantiating an instant messaging thread between the third party and the user, who depending upon the embodiment may be anonymized to withhold the user's personal contact information or other personal information from the third party. The instant messaging thread may be handled by an instant messaging service of the online system 140. In other embodiments other communication services of the online system 140 are used, such as an email service or a telephonic service.

The privacy protector 325 anonymizes user information to protect users from undesired communication of personal information, such as personal contact information. For example, when initiating a communication channel between a user and a third party (e.g., in response to the user interacting with a lead generation content item of the third party) the privacy protector 325 anonymizes the user's personal information. This may entail sending to the third party generic information. For example, rather than communicating to the third party which user interacted with the content item, the privacy protector 325 may restrict the communication to only indicating that a user performed the interaction, or may specify the user only by an anonymous identifier; the communication may further include one or more non-specific details of the user, such as a demographic. One embodiment of anonymizing user information by the privacy protector 325 is provided below with reference to FIG. 4.

The lead suggestion engine 330 operates with the content selection module 255 and models from the interaction learning module 260 to determine which lead generation content items should be communicated to which users. For example, the lead suggestion engine 330 uses a lead interaction model to determine which lead generation content items the lead generation content item injector 305 should add to which newsfeeds.

The third-party integrator 335 communicates with third parties. For example, the third-party integrator 335 alerts a third party that a user has interacted with a lead generation content item and that a communication channel needs to be opened between the user and the third party. The third-party integrator 335 may also assist in enabling the third party to open the communication channel. For example, if the communication channel is handled by a communication service of the online system 140 with which the third party does not have an account, the third-party integrator 335 creates an account for the third party so that it may communicate with the user.

The third-party integrator 335 may also enable third parties to set up payment options via the online system 140. For example, the third-party integrator 335 may enable third parties to receive payment, e.g., if a user selects an option to purchase a product in a lead generation content item or a message.

The lead content store 340 stores information pertaining to lead generation content items. For example, the lead content store 340 may store lead generation content items, recordation of which users to have been communicated lead generation content items, users who have interacted with the lead generation content items, information about third parties or other entities, and so on. The lead content store 340 may include online system tables such as online system tables 408A-C as detailed below. The lead content store 340 may be a relational or non-relational database depending upon the embodiment.

The messaging system 345 is a communication service provided by the online system 140. For example, the messaging system 345 is an instant messaging service by which users of the online system 140 may send each other instant messages. Alternatively, the messaging system 345 may be an email service, a voice service, or any other service through which users may communicate.

By recording information about which users interact with which lead generation content items, the online system 140 allows for analysis of the lead generation information. For example, if the recorded information is sent to third parties, the third parties may use the information to better tailor lead generation content items for users to increase the likelihood that users interact with the lead generation content items. Furthermore, by anonymizing user personal information, the online system prevents third parties from being able to malevolently use user personal information. For example, third parties cannot spam users with myriad phone calls and emails if the user's phone number and email address are not communicated to the third party.

Figure 4A:
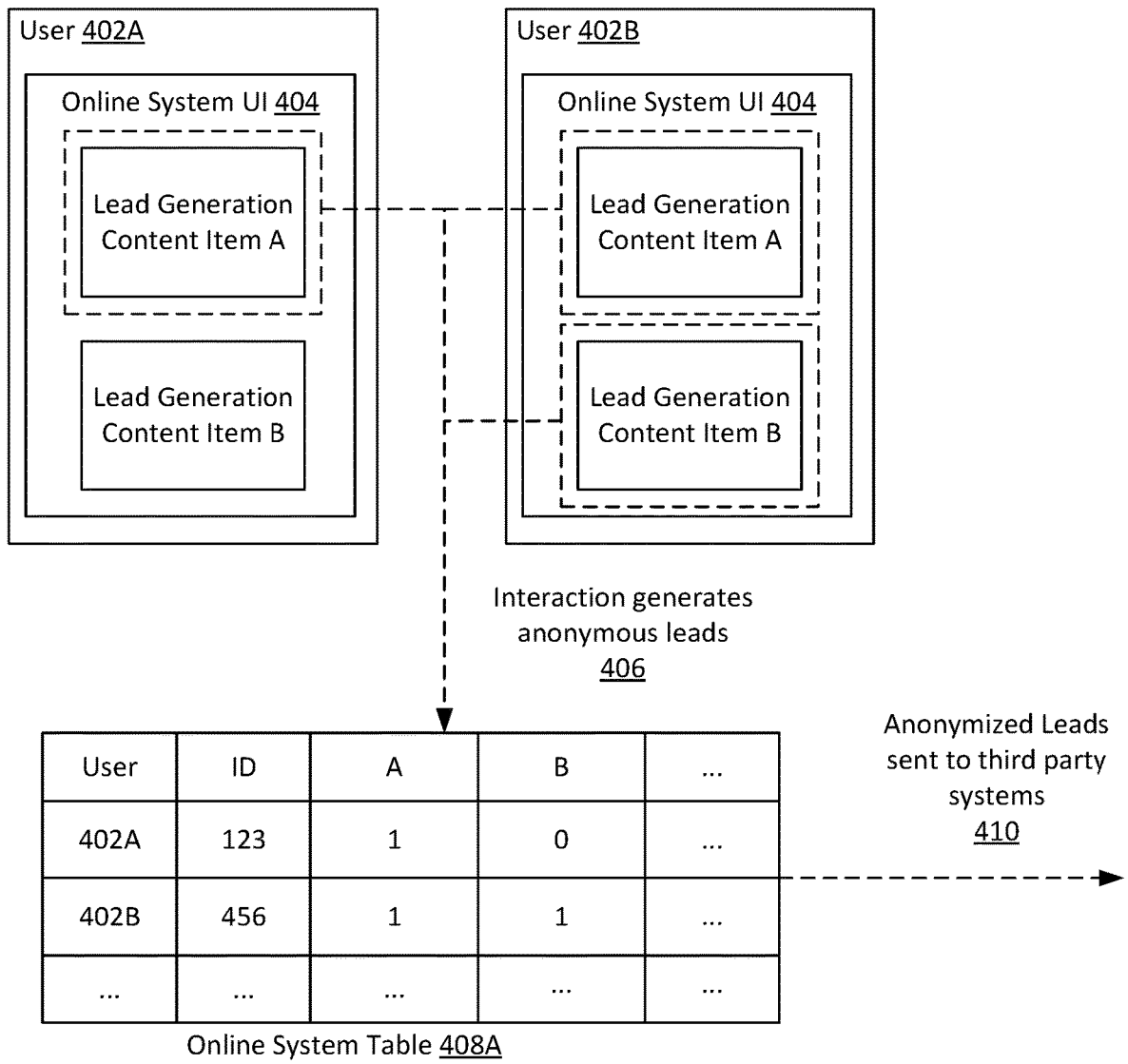
FIG. 4A is an example visualization of anonymizing user information, in accordance with an embodiment.

FIG. 4A is an example visualization of anonymizing user information, in accordance with an embodiment. Users 402A and 402B are each associated with an instance of an online system user interface (UI) 404. For example, each user 402 is associated with a client device 110 running an online system UI 404 with which the user 402 may interact with and use various services of the online system 140, such as view a newsfeed. Displayed within each online system UI 404 are two lead generation content items—a lead generation content item A and a lead generation content item B. For example, the lead generation content item A may be a lead generation content item pertaining to a car dealership, and the lead generation content item B may be a lead generation content item pertaining to a bakery. In this example, user 402A interacts with lead generation content item A and user 402B interacts with both lead generation content item A and lead generation content item B.

Each user's 402 interactions with lead generation content items generate 406 anonymized leads in online system table 408A. Online system table 408A records which users have interacted with which lead generation content items. For example, in a first column "User" the online system table 408A lists each user, in a second column "ID" the online system table 408A records anonymized identifiers for each user in the first column, and in additional columns "A" and "B" the online system table 408A records whether each user in the first column interacted with each lead generation content item. Depending upon the embodiment the online system table 408A may follow a different database schema and may record different or additional data. For example, online system table 408A may record various non-identifying characteristics of each user, such as a gender, age, geographic area, or so on. The online system table 408A may be stored in the lead content store 340 of the CRM system 235.

The CRM system 235 uses the information recorded in the online system table 408A to send 410 anonymized leads to third-party systems. For example, the CRM system 235 sends a message to a third-party system A that one user "123" interacted with lead generation content item A while one user "456" did not. In an embodiment, the message further includes characteristics of each user, such as an age and gender of each user. Alternatively, the message may include generalized information, such as an average age of users who interacted with lead generation content item A. By using anonymized identifiers (ID's) the CRM system 235 preserves the privacy of the users 402 while still allowing third parties to generate leads.

Figure 4B:
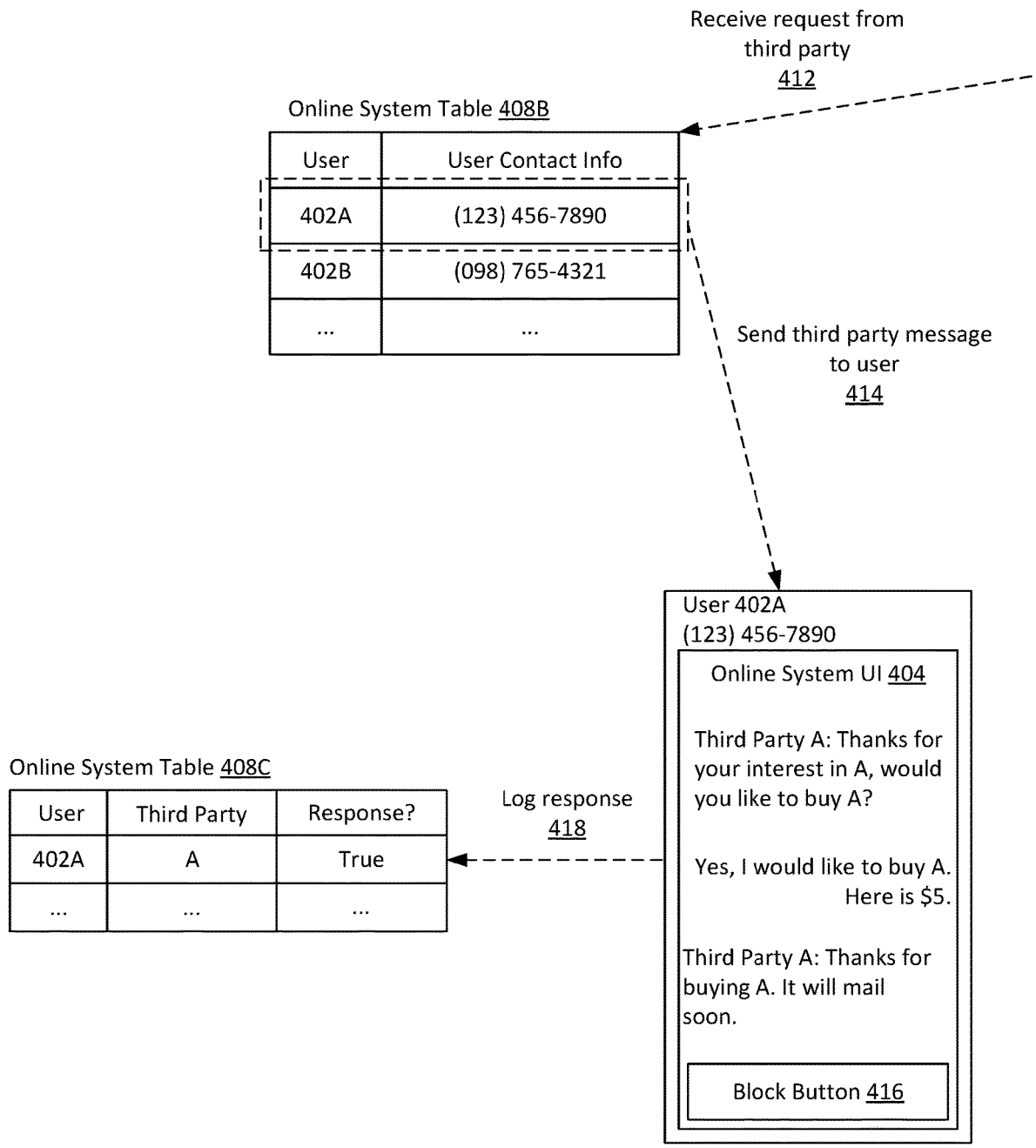
FIG. 4B is an example visualization of initiating a communication channel, in accordance with an embodiment.

FIG. 4B is an example visualization of initiating a communication channel, in accordance with an embodiment. The CRM system 235 receives 412 a request from a third party A to open a communication channel with user 402A. For example, a third party requests to open the communication channel in response to receiving the message sent 410 by the CRM system 235 that user 402A interacted with lead generation content item A. The request received 412 from the third party may include a third-party message to send to the user 402A via the communication channel.

The CRM system 235 accesses online system table 408B, which stores user's contact information, which is used to open a communication channel between user 402A and the third party. However, the communication channel is anonymized such that the third does not have access to user 402A's contact information or other personal information, such as the name or email address. For example, the third party may simply see the anonymous ID associated with the user 402A, which is "123" in this example. Conversely, the user 402A may see that the third party initiated communication.

Using the user's 402A user contact information, the CRM system 235 opens a communication channel and sends 414 the third-party message to the user 402A. The CRM system 235 further monitors the communication to determine whether the user responded to the third-party message. If so, the CRM system 235 may log 418 the fact that the user 402A responded to the third-party message. Depending upon the embodiment, the communication channel is encrypted and the CRM system 235 can identify whether or not the user 402A responded but not what the response comprised.

Information regarding whether or not users responded to a lead generation content item may be stored in an online system table 408C. If a third party wishes to access the information in the table, the third party may be restricted to only information regarding lead generation content items associated with the third party. Furthermore, the information may be anonymized when sent to the third party, e.g. using anonymous ID's for users.

The online system UI 404 includes a block button 416. Using the block button, the user 402A may close the communication channel and prevent the third party from opening additional communication channels. Depending upon the embodiment, use of the block button by a user also removes all data recorded for the user by the CRM system 235.

Optimizing End-to-End Lead Generation

Figure 5:
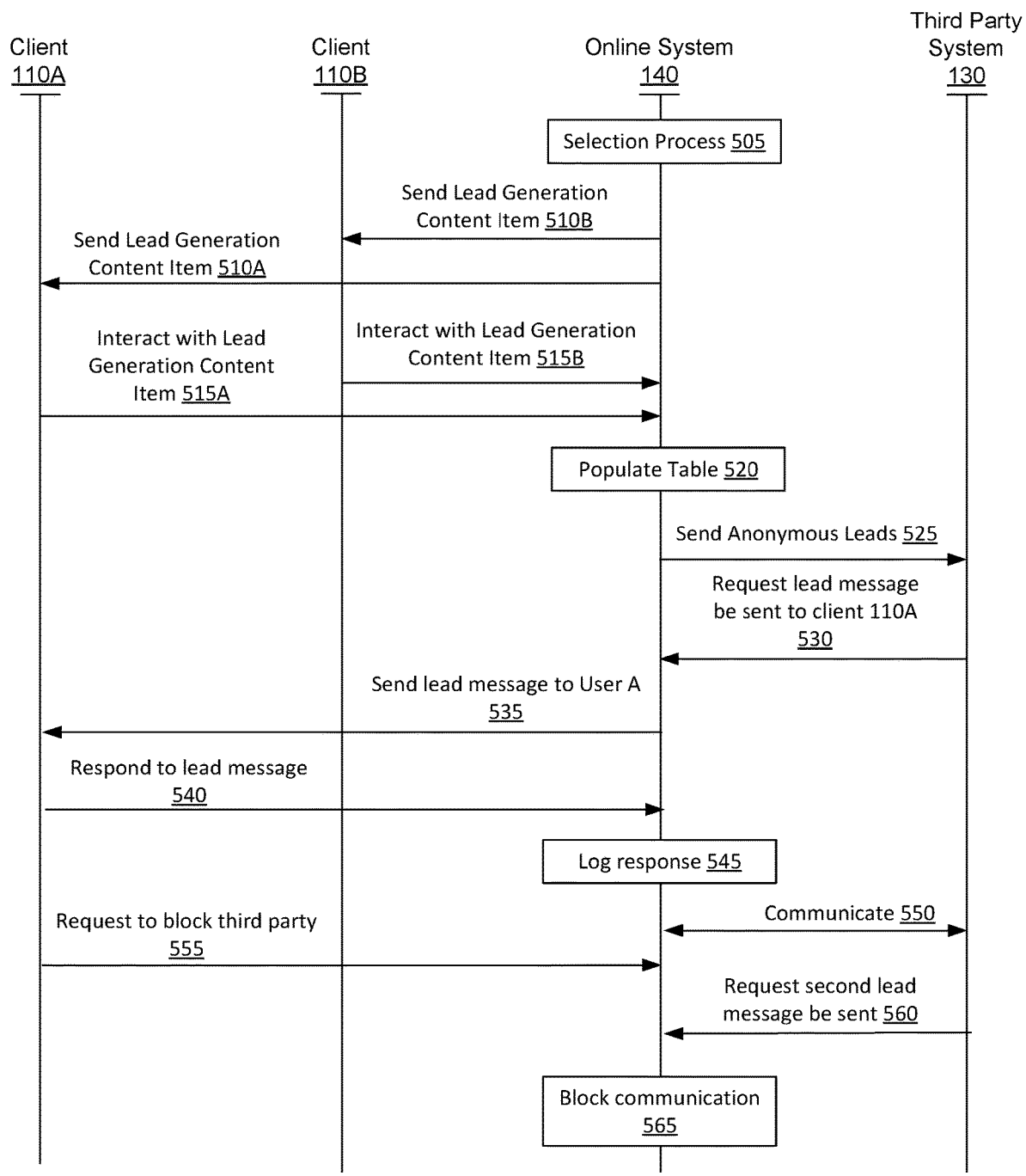
FIG. 5 is a process diagram of optimizing end-to-end lead generation, in accordance with an embodiment.

FIG. 5 is a process diagram of a method for enabling end-to-end lead generation, in accordance with an embodiment. The online system 140 performs 505 a selection process to select which lead generation content items to send to which users, each of whom is associated with a client device 110. For example, the online system 140 selects 505 from a pool of lead generation content items received from the third-party system 130. The online system 140 sends 510B a lead generation content item to client 110B and sends 510A another lead generation content item to client 110A. Each client 110 interacts 515 with the respective lead generation content item, with which information the online system 140 populates 520 an online system table. The online system 140 generates anonymous leads from the information and sends 525 the anonymous leads to the third-party system 130.

The third-party system 130 requests 530 that a lead message be sent to client 110A. The online system 140 sends 535 the lead message to client 110A via a communication channel set up using the personal contact information of the user associated with client 110A, to which the third-party system 130 does not have access. For example, the lead message is sent 535 using a communication service of the online system 140. The client 110A responds 540 to the lead message. The online system 140 logs 545 the response, which is communicated to the third-party system 130 using the communication channel. The client 110A and third-party system 130 further communicate 550 via the communication channel. The client 110A requests 555 to block the third-party system 130. As such the online system 140 terminates the communication channel. When the third-party system 130 requests 560 a second lead message be sent to the client 110, the online system blocks 565 the communication.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an online system from a third-party entity a lead generation content item that includes a selectable option;
   sending, by the online system, the lead generation content item to a client device associated with a user of the online system;
   receiving, from the client device, an interaction with the selectable option of the lead generation content item;
   sending, by the online system, an anonymized lead to the third-party entity that the client device interacted with the lead generation content item, wherein the anonymized lead identifies the user by including an anonymized identifier representing the user, the anonymized lead not including the user's personal information;
   receiving, by the online system from the third-party entity, a request that specifies the user, identified by the anonymized identifier, as a recipient of a textual lead message and includes the textual lead message;
   establishing, by the online system, a communication session via an instant messaging system of the online system between the third-party entity and the client device, wherein the user is identified to the third-party entity by the anonymized identifier; and
   sending, by the online system to the client device, the textual lead message in the communication session via the instant messaging system.

2. The method of claim 1, further comprising:
   recording, by the online system, for each of a plurality of users, a respective set of data comprising a respective plurality of characteristics, a set of lead generation content items with which the user interacted, and a set of lead generation content items with which the user did not interact; and
   training, by the online system, a lead message interaction model for predicting a likelihood of a subsequent user's interaction with a subsequent lead message sent from the third-party entity after the subsequent user interacts with a respective subsequent lead generation content item, using one or more of the recorded sets of data.

3. The method of claim 2, further comprising:
   using, by the online system, the trained lead message interaction model to predict a second user's interaction with a second lead message; and
   using, by the online system, the prediction in a process for selecting the lead generation content item for the second user.

4. The method of claim 1, further comprising:
   receiving, by the online system, a request from the user of the online system to block communication with the third-party entity;
   terminating, by the online system, the communication session;
   receiving, by the online system, from the third-party entity, a request to open a new communication channel with the user; and
   denying, by the online system, the request to open the new communication channel.

5. The method of claim 1, wherein the anonymized lead further comprises generalized information of a plurality of users that interacted with the lead generation content item.

6. A non-transitory computer-readable storage medium storing computer program instructions executable by a processor to perform operations comprising:
   receiving, at an online system from a third-party entity a lead generation content item that includes a selectable option;
   sending, by the online system, the lead generation content item to a client device associated with a user of the online system;
   receiving, from the client device, an interaction with the selectable option of the lead generation content item;
   sending, by the online system, an anonymized lead to the third-party entity that the client device interacted with the lead generation content item, wherein the anonymized lead identifies the user by including an anonymized identifier representing the user, the anonymized lead not including the user's personal information;
   receiving, by the online system from the third-party entity, a request that specifies the user, identified by the anonymized identifier, as a recipient of a textual lead message and includes the textual lead message;

establishing, by the online system, a communication session via an instant messaging system of the online system between the third-party entity and the client device, wherein the user is identified to the third-party entity by the anonymized identifier; and sending, by the online system to the client device, the textual lead message in the communication session via the instant messaging system.

7. The non-transitory computer-readable storage medium of claim 6, the operations further comprising:

recording, by the online system, for each of a plurality of users, a respective set of data comprising a respective plurality of characteristics, a set of lead generation content items with which the user interacted, and a set of lead generation content items with which the user did not interact; and training, by the online system, a lead message interaction model for predicting a likelihood of a subsequent user's interaction with a subsequent lead message sent from the third-party entity after the subsequent user interacts with a respective subsequent lead generation content item, using one or more of the recorded sets of data.

8. The non-transitory computer-readable storage medium of claim 7, the operations further comprising:

using, by the online system, the trained lead message interaction model to predict a second user's interaction with a second lead message; and using, by the online system, the prediction in a process for selecting the lead generation content item for the second user.

9. The non-transitory computer-readable storage medium of claim 6, the operations further comprising:

receiving, by the online system, a request from the user of the online system to block communication with the third-party entity;

terminating, by the online system, the communication session;

receiving, by the online system, from the third-party entity, a request to open a new communication channel with the user; and denying, by the online system, the request to open the new communication channel.

10. The non-transitory computer-readable storage medium of claim 6, wherein the anonymized lead further comprises generalized information of a plurality of users that interacted with the lead generation content item.

11. A system comprising:

a processor for executing computer program instructions; and a non-transitory computer-readable storage medium storing computer program instructions executable by the processor to perform operations comprising:

receiving, at an online system from a third-party entity a lead generation content item that includes a selectable option;

sending, by the online system, the lead generation content item to a client device associated with a user of the online system;

receiving, from the client device, an interaction with the selectable option of the lead generation content item;

sending, by the online system, an anonymized lead to the third-party entity that the client device interacted with the lead generation content item, wherein the anonymized lead identifies the user by including an anonymized identifier representing the user, the anonymized lead not including the user's personal information;

receiving, by the online system from the third-party entity, a request that specifies the user, identified by the anonymized identifier, as a recipient of a textual lead message and includes the textual lead message;

establishing, by the online system, a communication session via an instant messaging system of the online system between the third-party entity and the client device, wherein the user is identified to the third-party entity by the anonymized identifier; and sending, by the online system to the client device, the textual lead message in the communication session via the instant messaging system.

12. The system of claim 11, the operations further comprising:

recording, by the online system, for each of a plurality of users, a respective set of data comprising a respective plurality of characteristics, a set of lead generation content items with which the user interacted, and a set of lead generation content items with which the user did not interact; and training, by the online system, a lead message interaction model for predicting a likelihood of a subsequent user's interaction with a subsequent lead message sent from the third-party entity after the subsequent user interacts with a respective subsequent lead generation content item, using one or more of the recorded sets of data.

13. The system of claim 12, the operations further comprising:

using, by the online system, the trained lead message interaction model to predict a second user's interaction with a second lead message; and using, by the online system, the prediction in a process for selecting the lead generation content item for the second user.

14. The system of claim 11, the operations further comprising:

receiving, by the online system, a request from the user of the online system to block communication with the third-party entity;

terminating, by the online system, the communication session;

receiving, by the online system, from the third-party entity, a request to open a new communication channel with the user; and denying, by the online system, the request to open the new communication channel.

15. The system of claim 11, wherein the anonymized lead further comprises generalized information of a plurality of users that interacted with the lead generation content item.

16. The method of claim 1, further comprising:

receiving, at the online system from the third-party entity, a second lead generation content item;

determining, by the online system, whether user interaction with the second lead generation content item would share personal contact information of the user with the third-party entity; and responsive to determining that user interaction with the second lead generation content item would not share personal contact information of the user with the third-party entity, sending the second lead generation content item to the client device for presentation.

17. The method of claim 4, further comprising:

responsive to receiving the request from the user of the online system to block communication with the third-party entity, removing, by the online system, data recorded for the user from a particular data store of the online system, wherein the third-party entity has access to view the particular data store.

18. The non-transitory computer-readable storage medium of claim 6, the operations further comprising:
receiving, at the online system from the third-party entity, a second lead generation content item;
determining, by the online system, whether user interaction with the second lead generation content item would share personal contact information of the user with the third-party entity; and
responsive to determining that user interaction with the second lead generation content item would not share personal contact information of the user with the third-party entity, sending the second lead generation content item to the client device for presentation.

19. The non-transitory computer-readable storage medium of claim 6, the operations further comprising:

responsive to receiving the request from the user of the online system to block communication with the third-party entity, removing, by the online system, data recorded for the user from a particular data store of the online system, wherein the third-party entity has access to view the particular data store.

20. The system of claim 11, the operations further comprising:
receiving, at the online system from the third-party entity, a second lead generation content item;
determining, by the online system, whether user interaction with the second lead generation content item would share personal contact information of the user with the third-party entity; and
responsive to determining that user interaction with the second lead generation content item would not share personal contact information of the user with the third-party entity, sending the second lead generation content item to the client device for presentation.

\* \* \* \* \*